United States Patent Office 3,464,657
Patented Sept. 2, 1969

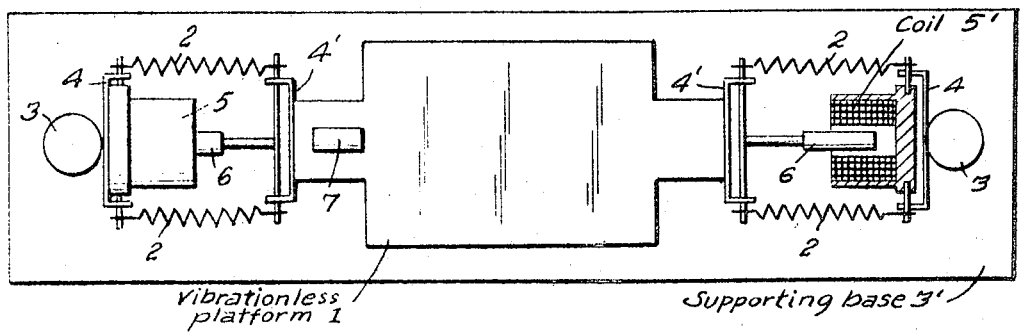
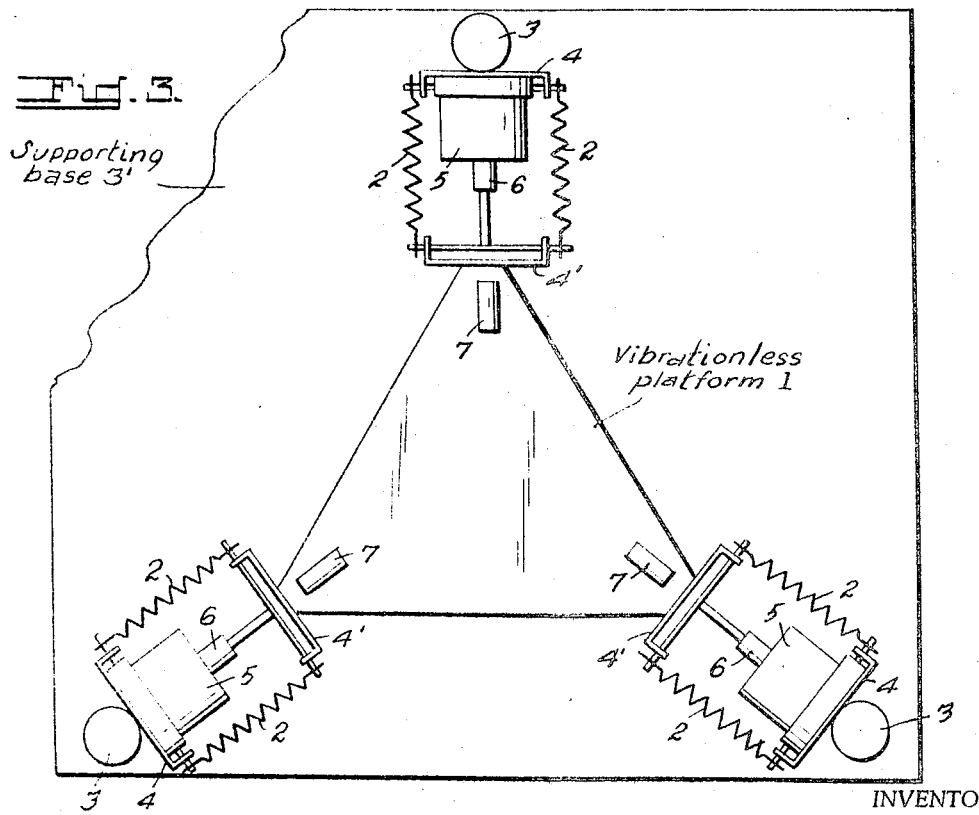

3,464,657
VIBRATION DAMPED PLATFORM
Richard W. Bullard, El Paso, Tex., assignor to the United States of America as represented by the Secretary of the Army
Filed Aug. 30, 1967, Ser. No. 665,206
Int. Cl. F16f *15/04;* F16m *11/00;* F16d *63/00*
U.S. Cl. 248—20                    5 Claims

ABSTRACT OF THE DISCLOSURE

Seismic vibrations, or vibrations from other sources, tend to cause a supporting framework to vibrate. Springs tend to reduce vibration of the platform. However, when the supporting framework begins to move to the left, for example, the posts, springs, etc. start to move the framework and accelerometer in the same direction. A low voltage, produced by an accelerometer, is fed into an amplifier and to a coil. This exerts a force on the core in a direction opposing the original movement (to the right) to balance the original force and thereby minimize movement of the framework.

---

The invention described herein may be manufactured, used, and licensed by or for the U.S. Government for governmental purposes without the payment to me of any royalty thereon.

BRIEF SUMMARY

A platform supported by a plurality of shock absorbing units disposed in opposed relationship about the platform's periphery and attached to a supporting base and to the platform. Each shock absorbing unit comprising an accelerometer, a spring biasing means and an electromagnetic coil-core means. Movement of the platform results in an electric current being generated by the accelerometer, the current is amplified and used to energize the electromagnetic coil-core means. In many types of installations it is important to have a substantially vibrationless platform, for example, where highly sensitive equipment need be mounted free from or insulated from earth (seismic) vibrations. Massive slabs of concrete, mounted on piers extending deep into the earth, are fairly good. However, these, and other means for mounting a platform. have limitations. As exemplary, concrete slabs and piers are very expensive. They require many man hours for preparation. Generally heavy construction equipment and materials must be moved in for the construction process. This requires much time and expense, especially if the location is off the highways, in rugged mountains, in swampy areas, aboard ships, planes or land vehicles, or far from the usual base of operations.

Therefore, it is an object of this invention to provide relatively simple and inexpensive platform-supporting means which can be easily manufactured, transported to a site of use and set up quickly and easily, and which supports a platform relatively vibrationless.

In the drawing:

FIG. 1 is a diagrammatic illustration of the invention;
FIG. 2 is a block diagram of the electrical circuitry; and
FIG. 3 is a diagram of a modification.

Detailed description:

Substantially vibrationless platform 1 is supported by springs 2 which are attached to platform 1 and to support posts 3 mounted on supporting base 3'. Low-friction hinges or pivot means 4, 4' are preferably used at the point where the springs are connected to posts 3 and platform 1 respectively. Well-known means may be used for adjustment or original tensioning of the springs.

Coil 5' and core 6, which may be magnetized if desired, form an electromagnetic means or solenoid 5 usable, when energized, to bias the platform. As illustrated in FIG. 2, accelerometer 7 supplies electrical current to flow from power supply 8 to solenoid 5. Accelerometer 7 is a small generator which produces an electrical output whenever it is moved.

FIG. 3 illustrates a three-point support for platform 1. Three solenoids and three accelerometers are illustrated for restoring the platform from movement in any direction.

Instead of using accelerometers 7 it would be possible to use coil 5' and magnetized core 6 to generate the initial electrical current. This could be amplified and fed back to coil 5' as a counter electromotive force to bias the platform in a direction opposite to the initial direction of movement.

OPERATION

If supporting base 3' and posts 3 move slightly, one or more of the posts 3 moves away from platform 1. Post 3, acting through springs 2, tends to pull platform 1 and the accelerometer 7 in the direction of that post. The accelerometer, upon being moved slightly, produces a slight electical output. This is fed into power supply 8, where it may be amplified if desired, and is fed to solenoid 5. The solenoid then exerts a force to restore the platform to its original position. Thus, the slightest of movement of an accelerometer 7 results in a counterforce to arrest movement of the platform.

In FIG. 1 only one solenoid and accelerometer are illustrated to arrest movement in one direction. If desired the parts could be duplicated to arrest movement in two directions. Or, three could be used as illustrated in FIG. 3, or any other number could be used in accordance with the teachings of this invention to obtain desirable results in various types of installations.

I claim:

1. Vibration damping apparatus comprising a supporting base, a substantially vibrationless platform, stabilizing means connected to said base and to said platform comprising a plurality of opposing units, the units comprising opposing resilient means biasing said platform toward a neutral position, electromagnetic coil-core means, and movement-responsive means to energize said coil-core means.

2. Apparatus as in claim 1 wherein said resilient means is connected to said base and said platform and supports said platform.

3. Apparatus as in claim 1 wherein said movement-responsive means comprises accelerometer means.

4. Apparatus as in claim 1 wherein said plurality of units comprises three, disposed on opposing sides of said platform.

5. Apparatus as in claim 1, said stabilizing means comprising a magnetized core attached to said platform and a coil attached to said base, said core and said coil forming a generator to produce an electrical current in the coil when there is relative motion between said core and said coil, means to feed said electrical current back into said coil to produce a force tending to bias said core and coil to their original relative positions.

References Cited

UNITED STATES PATENTS 2,964,272    12/1960    Olson _____ 248—20 XR
3,310,263    3/1967    Cavanaugh _____ 248—23

ROY D. FRAZIER, Primary Examiner

J. F. FOSS, Assistant Examiner

U.S. Cl. X.R.
188—1; 248—13, 358